United States Patent
Eby et al.

(10) Patent No.: US 6,442,640 B1
(45) Date of Patent: Aug. 27, 2002

(54) METHOD AND APPARATUS FOR DETERMINING AN ADDRESS UNIQUELY IDENTIFYING A HARDWARE COMPONENT ON A COMMON BUS

(75) Inventors: Paula M. Eby, Hopatcong; Harvey Rubin, Morris Township, Morris County; Michael Ralph Simmons, Fort Lee; Keith Elden Strege, Branchburg Township, Somerset County, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/198,289

(22) Filed: Nov. 23, 1998

(51) Int. Cl.[7] .......................... G06F 13/38; G06F 13/40
(52) U.S. Cl. ...................... 710/305; 710/300; 710/306; 710/3; 345/156; 345/163
(58) Field of Search ................................ 710/100, 300, 710/3, 104; 345/156, 163

(56) References Cited

U.S. PATENT DOCUMENTS 4,829,554 A * 5/1989 Barnes et al. ............... 455/432
4,847,834 A * 7/1989 Bryant ........................ 370/449

OTHER PUBLICATIONS

L.A. Baxter et al., "System 75: Communications and Control Architecture," AT&T Technical Journal, vol. 64, No. 1, 153–173 (Jan. 1985).

* cited by examiner

Primary Examiner—Rupal Dharia
(74) Attorney, Agent, or Firm—Ryan, Mason & Lewis, LLP

(57) ABSTRACT

A method and apparatus are disclosed for automatically determining system configuration information, including the sector, carrier frequency and bus assignment of each hardware component installed on equipment, such as a cell station. In an illustrative cell station implementation, each cell station includes a hardware controller that communicates on a common bus with a plurality of hardware components. When each cell station is powered up or reset, each hardware component reads an identification value (or a portion thereof) that has some physical significance from a backplane on which the hardware component is installed. The identification information obtained from the backplane is used to derive a bus address that uniquely identifies each hardware component on the common bus. In addition, the identification information contains information that describes the hardware component and how the component is located within the cell station. In the illustrative embodiment, the identification value identifies the carrier frequency, frame, sector number (such as $\alpha$, $\beta$, $\gamma$), unit type and unit number associated with the hardware component. The hardware component can provide information to the hardware controller that allows the hardware controller to generate a map of the hardware components located within the cell and determine their interconnection.

34 Claims, 5 Drawing Sheets

HARDWARE COMPONENT CONFIGURATION
DATABASE - 300

| | HARDWARE COMPONENT 330 | CARRIER FREQUENCY (2 BITS) 340 | FRAME (2 BITS) 350 | SECTOR (4 BITS) 360 | UNIT TYPE (4 BITS) 370 | UNIT NUMBER (4 BITS) 380 | BUS ADDRESS (8 BITS) 390 |
|---|---|---|---|---|---|---|---|
| 305 | A | 1 | 1 | γ | RADIO | 1 | 0A |
| 310 | B | 0 | 1 | 0 | CLOCK | 1 | 2A |
| 320 | ... H | 2 | 1 | α | RADIO | 4 | 1B |

FIG. 3

PERIPHERAL BUS ID MAPPING
400

| offset | 00 - 1F | 20 - 3F | 40 - 5F | 60 - 7F | 80 - 9F | A0 - BF | C0 - DF | E0 - FF | offset |
|---|---|---|---|---|---|---|---|---|---|
| 0 | broadcast | Radio (cont) | Amp. | | | | | External Equip. | 0 |
| 1 | reserved | | | | | | | | 1 |
| 2 | reserved | | | | | | | | 2 |
| 3 | reserved | | | | | | | | 3 |
| 4 | reserved | | | | | | | | 4 |
| 5 | reserved | | | | | | | | 5 |
| 6 | reserved | | | | | | | | 6 |
| 7 | reserved | | | | | | | | 7 |
| 8 | reserved | | | | | | | | 8 |
| 9 | reserved | | | | | | | | 9 |
| A | Radio | Clock | reserved | reserved | reserved | reserved | reserved | External Equip. | A |
| B | Radio | Clock | reserved | reserved | reserved | reserved | reserved | | B |
| C | Radio | Clock | reserved | reserved | reserved | reserved | reserved | | C |
| D | Radio | Clock | reserved | reserved | reserved | reserved | reserved | | D |
| E | Radio | Amp. | reserved | reserved | reserved | reserved | reserved | | E |
| F | Radio | Amp. | reserved | reserved | reserved | reserved | reserved | | F |
| 10 | Radio | Amp. | reserved | reserved | reserved | reserved | reserved | Test Equip | 10 |
| 11 | Radio | Amp. | reserved | reserved | reserved | reserved | reserved | Test Equip | 11 |
| 12 | Radio | Amp. | reserved | reserved | reserved | reserved | reserved | Test Equip | 12 |
| 13 | Radio | Amp. | reserved | reserved | reserved | reserved | reserved | Test Equip | 13 |
| 14 | Radio | Amp. | reserved | reserved | reserved | reserved | reserved | Controller | 14 |
| 15 | Radio | Amp. | reserved | reserved | reserved | reserved | reserved | Controller | 15 |
| 16 | Radio | Amp. | reserved | reserved | reserved | reserved | reserved | Controller | 16 |
| 17 | Radio | Amp. | reserved | reserved | reserved | reserved | reserved | Controller | 17 |
| 18 | Radio | Amp. | reserved | reserved | reserved | reserved | reserved | Controller | 18 |
| 19 | Radio | Amp. | reserved | reserved | reserved | reserved | reserved | Controller | 19 |
| 1A | Radio | Amp. | reserved | reserved | reserved | reserved | reserved | Controller | 1A |
| 1B | Radio | Amp. | reserved | reserved | reserved | reserved | reserved | Controller | 1B |
| 1C | Radio | Amp. | reserved | reserved | reserved | reserved | reserved | Controller | 1C |
| 1D | Radio | Amp. | reserved | reserved | reserved | reserved | reserved | Pri CRC | 1D |
| 1E | Radio | Amp. | reserved | reserved | reserved | reserved | reserved | reserved | 1E |
| 1F | Radio | Amp. | reserved | reserved | reserved | reserved | reserved | | 1F |

FIG. 4

METHOD AND APPARATUS FOR DETERMINING AN ADDRESS UNIQUELY IDENTIFYING A HARDWARE COMPONENT ON A COMMON BUS

CROSS REFERENCE TO RELATED APPLICATION

The present invention is related to U.S. patent application Ser. No. 09/198,098 entitled "A Method And Apparatus For Dynamically Determining An Address Uniquely Identifying A Hardware Component On A Common Bus," filed contemporaneously herewith, assigned to the assignee of the present invention and incorporated by reference herein.

FIELD OF THE INVENTION

The present invention relates to a method and apparatus for updating system configuration information, and more particularly, to a method and apparatus for determining physical configuration information and for assigning bus addresses to hardware components installed on equipment, such as a cell station.

BACKGROUND OF THE INVENTION

Conventional cellular telephone systems include a central control station that interconnects the cellular telephone system with any suitable telephone switching system, such as the Public Switched Telephone Network (PSTN), and one or more cell stations. The cell stations are generally remote from the central control station and are typically placed throughout a cellular telephone service area. Telephone calls may be selectively placed by the central control station between standard land line telephone subscribers of the PSTN and a cellular telephone unit or directly between two cellular telephone units, in a known manner. For a more detailed description of a suitable cellular telephone system, see, for example, U.S. Pat. No. 4,829,554, incorporated by reference herein.

In order for a cell station to perform required function, the cell station typically incorporates hardware components, often referred to as "circuit packs." The same cell station, for example, might include a set of transceivers and other hardware equipment, such as control and timing boards, for communicating with cellular telephone units in a known manner. In addition, a cell station can include one or more interface boards for communicating, for example, on a T1 line with a switch of the PSTN. In order for the cell station to properly communicate with and supervise each of the various hardware components, the cell station also includes a hardware controller. The hardware controller and each of the hardware components are typically stored by the cell station on a frame or rack.

In the event of a hardware component failure or when routine servicing is required, a given hardware component on a cell station might be replaced by a compatible piece of hardware, having a different manufacturer, model number or version. In addition, additional hardware components may be added to the cell station to increase the capacity of the cell station, or the cell station configuration may otherwise be modified. As each new hardware component is added to a cell station, the hardware component must typically be associated with a particular sector (antenna) and carrier frequency on the cell station.

Each hardware component typically communicates with the hardware controller and with one another on a common bus. In order to differentiate each hardware component on the common bus, each hardware component is assigned a unique address. The hardware controller maintains a directory that maps the sector and carrier frequency associated with each hardware component, as well as the corresponding bus address. The system configuration information stored by the hardware controller must match the physical hardware components that are actually installed on the cell station.

Some systems for determining system configuration information, however, including sector, carrier frequency and bus assignments for each hardware component, are labor-intensive and require considerable manual effort. Specifically, an operator typically manually enters the relationship between the physical address of each hardware component and the corresponding logical connection (sector and carrier frequency) for all hardware components installed on a given cell station. In addition, each slot often has a prewired address. When a hardware component is plugged into the slot, the hardware component reads the address value from the backplane and uses the address to communicate with other hardware components and the hardware controller on the common bus. Since the prewired backplane address has little or no physical location information, manually generated conversion information is needed to convert the backplane address to an understanding of the type of hardware component that is at that address, as well as the sector and carrier frequency associated with the hardware component.

As apparent from the above-described deficiencies with conventional techniques for obtaining system configuration information, a need exists for an automated technique for automatically determining system configuration information and for assigning addresses on a common bus.

SUMMARY OF THE INVENTION

Generally, according to one aspect of the invention, a method and apparatus are disclosed for automatically determining system configuration information, including the sector, carrier frequency and bus assignment of each hardware component installed on equipment, such as a cell station. In an illustrative cell station implementation, each cell station includes a hardware controller that communicates on a common bus with a plurality of hardware components.

Each hardware component reads an identification value that has some physical significance from a backplane on which the hardware component is installed. The physical identification value indicates how the hardware component is interconnected in a larger piece of equipment. In the illustrative embodiment, the physical identification value identifies the carrier frequency, frame, sector number (such as $\alpha$, $\beta$, $\gamma$), unit type and unit number associated with the hardware component. The identification value may be set by hardwiring the value into the backplane, manually adjusting one or more dip switches, or a combination of the foregoing. In an alternate embodiment, the identification value may be programmatically set, for example, by the hardware controller.

Generally, each hardware component reads only a portion of the identification value from the backplane. For example, the hardware component generally knows its own unit type. In addition, some hardware components, such as a clock board, are common across all carrier frequencies and sectors in the cell station, so such global hardware components do not need to read the carrier frequency and sector fields of the identification value.

According to one aspect of the invention, the physical identification information obtained from the backplane is used by the hardware components to derive a bus address that uniquely identifies each hardware component on the common bus. When a cell station is powered up, each hardware component reads the corresponding identification value and determines a unique bus address for communicating on the common bus.

According to another aspect of the invention, the physical identification information obtained from the backplane conveys physical configuration information to the hardware components. Thus, the hardware component can report the physical configuration information to the hardware controller and allow the hardware controller to identify each hardware component and to determine how the various hardware components are interconnected. Thus, in an embodiment where the identification value for each hardware component is unknown to the hardware controller (for example, where the identification value is manually set by hardwiring the value into the backplane or by adjusting one or more dip switches), the hardware controller can generate a map or database of the hardware components located within the cell and determine their interconnection.

A more complete understanding of the present invention, as well as further features and advantages of the present invention, will be obtained by reference to the following detailed description and drawings.

BRIEF DESCRIPTION OF THE DRAWINGS

FIG. 3 illustrates a sample table from the hardware component configuration database of FIG. 1;

FIG. 4 illustrates an illustrative partitioning of a 256 bus address space; and

DETAILED DESCRIPTION

Figure 1:
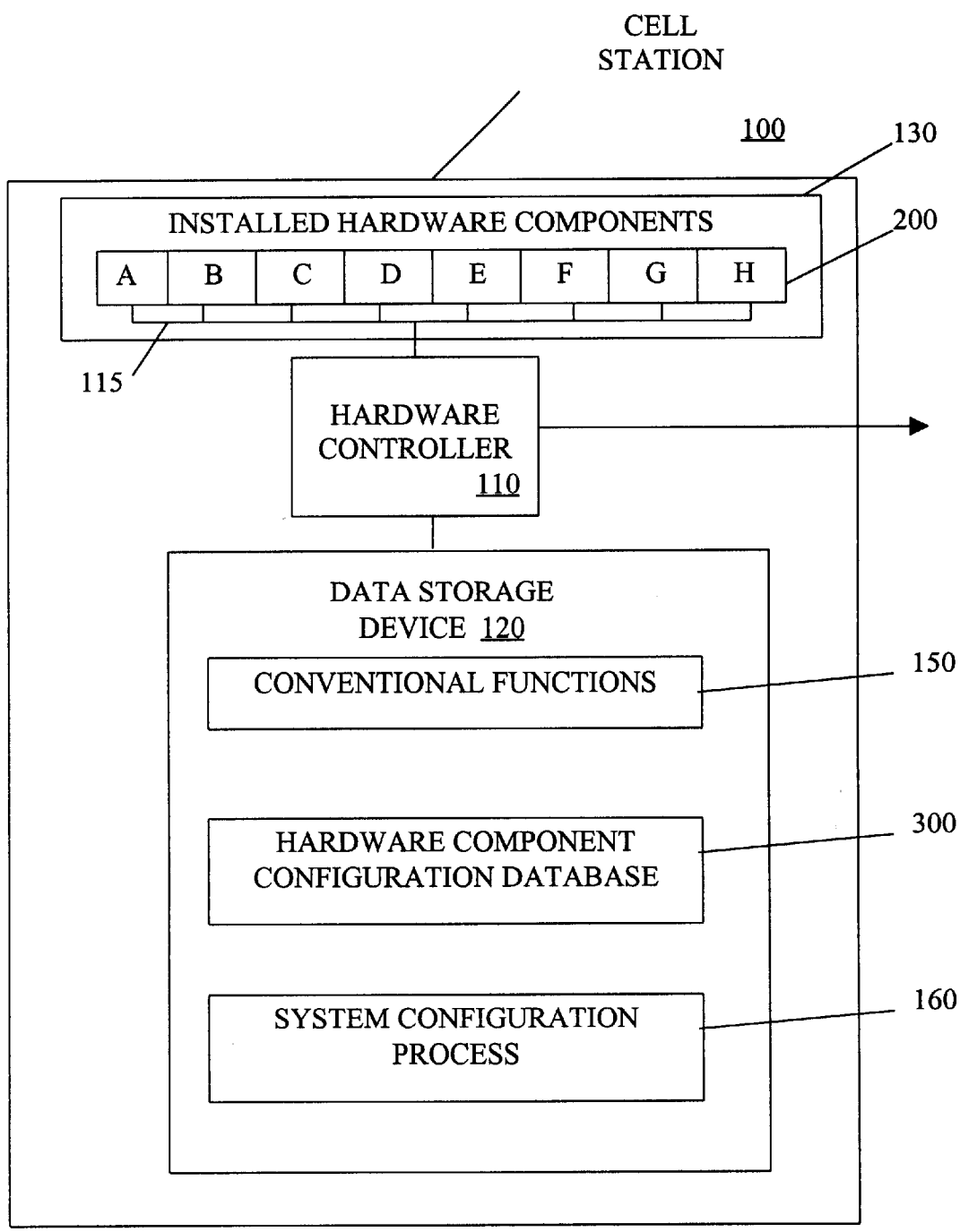
FIG. 1 is a schematic block diagram illustrating a cell station, in accordance with the present invention.

FIG. 1 is a block diagram showing the architecture of an illustrative cell station 100 in accordance with the present invention. The cell station 100 preferably includes a hardware controller 110 that communicates on a common bus 115 with a plurality of hardware components 200A–200H. The hardware components 200A–200H may be installed, for example, on one or more frames or racks 130 on the cell station 100. The hardware components 200A–200H, such as an illustrative hardware component 200, are discussed further below in conjunction with FIG. 2.

According to a feature of the present invention, each hardware component 200A–200H reads an identification value from a backplane (not shown) of the frame 130 that has some physical significance. A backplane is an assembly that provides mechanical and electrical connections to multiple hardware components 200A–200H. The physical identification value describes the hardware component and how the hardware component is located within the cell station 100.

In one illustrative implementation, the identification value is a 16 bit value, with four bits allocated for identifying the carrier frequency and frame associated with the hardware component; four bits allocated for identifying the sector number (such as α, β, γ) associated with the hardware component; four bits allocated for identifying the unit type of the hardware component, such as a radio, a clock board, or an amplifier; and four bits allocated for identifying the unit number of the hardware component. The unit number is used to differentiate those units that match all prior descriptors. For example, the unit number can differentiate between a number of channel coder units that are assigned the same carrier frequency and sector, and have the same unit type.

The identification value for each hardware component 200A–200H may be set, for example, by hardwiring the value into the backplane, manually adjusting one or more dip switches, or a combination of the foregoing. In an alternate embodiment, the 16-bit identification value (or portions thereof) may be programmatically set, for example, by the hardware controller 110.

Generally, each hardware component 200 reads only a portion of the 16 bit value from the backplane. For example, the hardware component always knows its own unit type. In other words, the hardware component knows whether it is, for example, a radio, a clock board, or an amplifier. In addition, some hardware components, such as a clock board, are common across all carrier frequencies and sectors in the cell station 100, so such global hardware components do not need to read the carrier frequency and sector fields of the 16 bit value. Rather, in one embodiment, such global hardware components set the carrier frequency and sector fields to zero (0).

According to one feature of the present invention, the physical identification information obtained from the backplane is used by the hardware components 200A–200H to derive a bus address that uniquely identifies each hardware component 200 on the common bus. When a cell station 100 is powered up, each hardware component 200 reads the corresponding identification value and determines a unique bus address for communicating on the common bus 115.

According to another feature of the present invention, the physical identification information obtained from the backplane conveys physical configuration information to the hardware components 200A–200H. Thus, a hardware component 200 can report the physical configuration information to the hardware controller 110 and allow the hardware controller 110 to identify each hardware component 200 and to determine how the various hardware components 200A–200H are interconnected. In an embodiment where the identification value is manually set by hardwiring the value into the backplane or by adjusting one or more dip switches, the identification value for each hardware component 200 may not be known to the hardware controller 110. Thus, the physical configuration information reported by the hardware components 200A–200H to the hardware controller 110 allows the hardware controller 110 to generate a map or database of the hardware components 200A–200H located within the cell and to determine their interconnection.

Thus, upon powering up the cell station 100, the present invention allows each of the hardware components to calculate a unique 8 bit address from the backplane physical identification information, and to provide the identification information to the hardware controller 110. In this manner, as discussed below, the hardware controller 110 can (i) uniquely communicate with each hardware component, and (ii) generate a map or database of the hardware components located within the cell and determine their interconnection. Once the bus addresses for the hardware component are assigned in accordance with the present invention, the cell station 100 operates normally, forwarding the messages that are received from the central control station (not shown) to the hardware components 200A–200H and vice versa, as required.

As shown in FIG. 1, the cell station 100 preferably includes a hardware controller 110 and related memory, such as a data storage device 120, which may be distributed or local. The hardware controller 110 may be embodied as a single processor, or a number of local or distributed processors operating in parallel. The data storage device 120 and/or a read only memory (ROM) are operable to store one or more instructions, which the hardware controller 110 is operable to retrieve, interpret and execute.

The data storage device 120 preferably includes the code 150 to perform supervisory, control functions and other conventional functions for communicating with cellular telephones and a central control station (not shown). For a detailed description of conventional functions of a cell station 100, see, for example, U.S. Pat. No. 4,829,554, incorporated by reference above. In addition, the data storage device 120 includes a hardware component configuration database 300, discussed further below in conjunction with FIG. 3, for storing the carrier frequency, frame, sector number (such as α, β, γ), unit type and unit number associated with each hardware component on the cell station 100. In addition, the data storage device 120 includes a system configuration process 160 that communicates with the hardware components 200A–200H to compile the configuration information and generate the hardware component configuration database 300.

It is noted that the cell station 100 can provide the local configuration information to a central cell controller (not shown), as would be apparent to a person of ordinary skill in the art. In this manner, the central cell controller can remotely determine the configuration of each cell station, such as the cell station 100.

Figure 2:
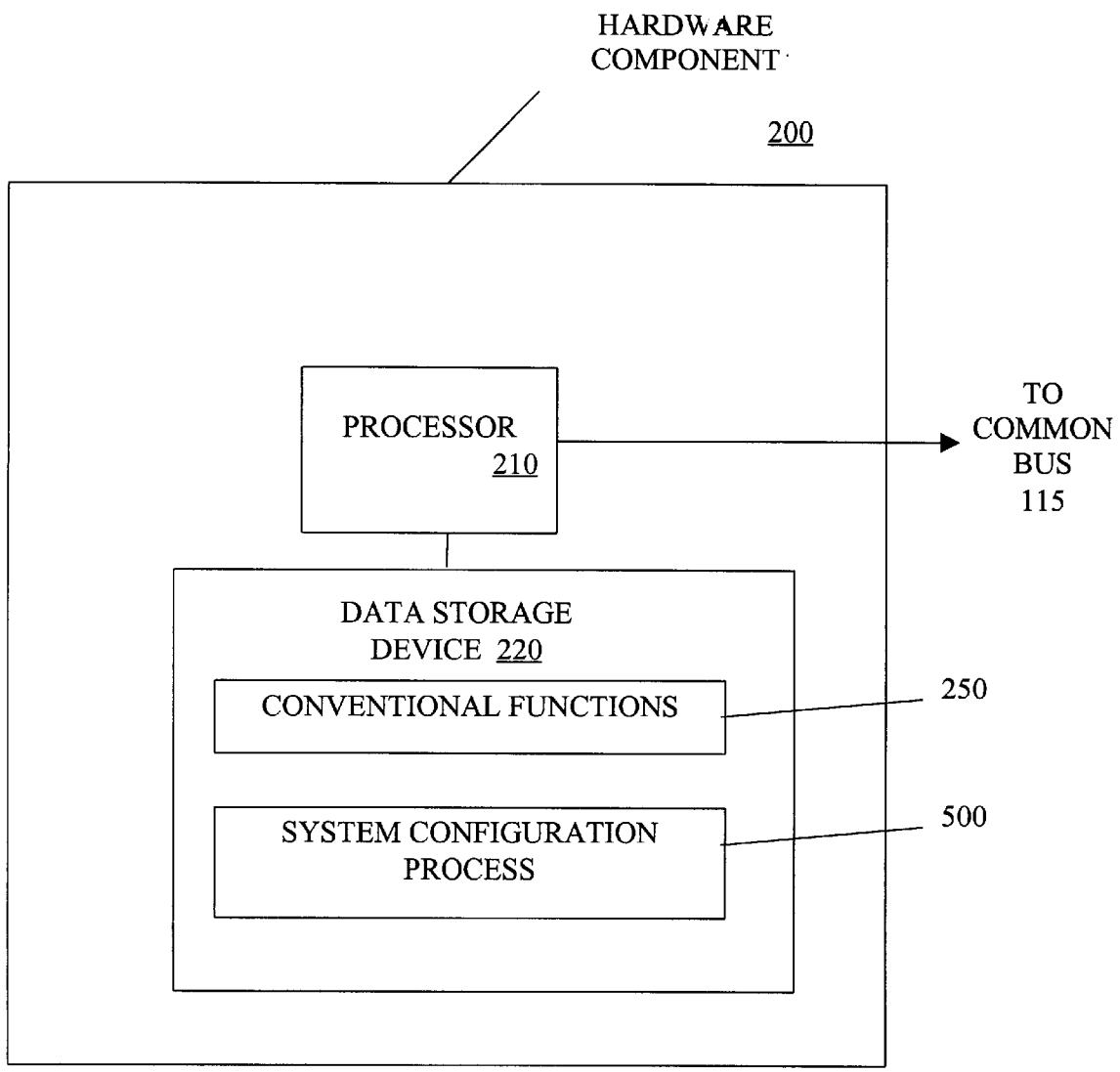
FIG. 2 is a schematic block diagram illustrating a hardware component of FIG. 1, in accordance with the present invention.

FIG. 2 is a block diagram showing the architecture of an illustrative hardware component 200 in accordance with the present invention. As shown in FIG. 2, each hardware component 200 includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute.

The data storage device 220 preferably includes the code 250 to perform conventional function for communicating with the hardware controller 110 of FIG. 1. In addition, the data storage device 220 includes a system configuration process 500, discussed below in conjunction with FIG. 5, that reads the corresponding 16 bit physical identification value from the backplane, and provides this information to the hardware controller 110. Thereafter, the hardware component 200 calculates a unique 8-bit bus address from a subset of the 16 bit value to communicate with other hardware components 200A–200H and the hardware controller on the common bus 115.

In the illustrative implementation, the bus address space contains 256 addresses (8-bits). The 256 bus address space may be partitioned as shown in FIG. 4. As shown in FIG. 4, address 00 is reserved by the bus hardware as a broadcast address. Thus, messages sent to address 00 can be received by all of the hardware components 200A–200H. In addition, address 0xFE and 0xFF are reserved for the bus hardware. The remainder of the bus address space is partitioned into regions dedicated to a specific hardware component type. For example, when a transmit amplifier powers up, the amplifier reads the physical identification information from the backplane to determine its offset from the Tx amplifier base address of 0x2E. Thus, the amplifier processes the following equation:

$$address_{TxAmp} = 0x2E + sssnn,$$

where sssnn is a binary number consisting of the three least significant bits, sss, of the sector field of the 16-bit physical identification information and the two least significant bits, nn, of the unit number field of the 16-bit physical identification information. Since 3 sector bits, sss, provides 8 levels and 2 unit number bits, nn, provides 4 levels, these hardware component-specific rules for determining the 8-bit address are based on assumptions that no more than eight (8) sectors or four (4) amplifiers per sector, are required for any bus.

It is noted that much of the address space shown in FIG. 4 is reserved for future growth or new hardware component types. It is further noted that additional partitioning schemes for the available bus address space and hardware component-specific rules for determining the 8-bit address can be used in accordance with the present invention, as would be apparent to a person of ordinary skill in the art. In addition, the present invention allows a hardware component that wants to communicate with a second hardware component to calculate the bus address of the second hardware component. For example, if an alpha (α) sector radio wants to communicate with an alpha (α) sector amplifier, the alpha (α) sector radio only needs to know the amplifier bus address algorithm, such as the partitioning of the bus address space as shown in FIG. 4, to determine the address of the alpha (α) sector amplifier.

Figure 5:
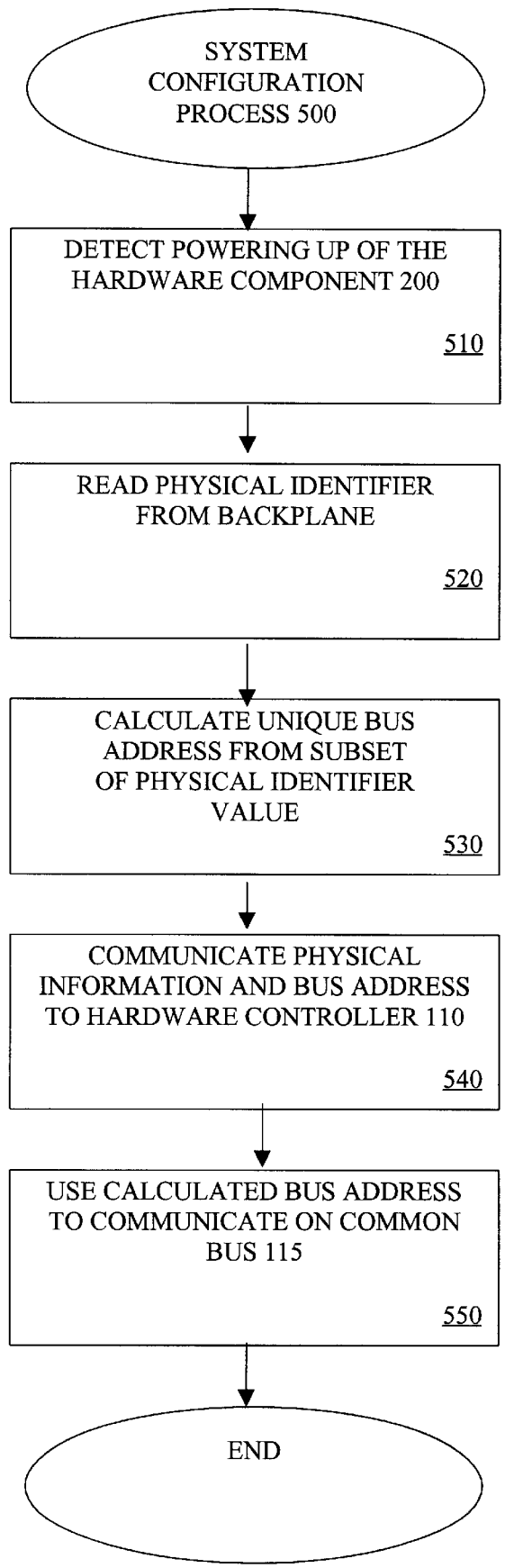
FIG. 5 is a flow chart describing an exemplary system configuration process performed by the hardware component of FIG. 2.

As previously indicated, each hardware component 200 implements a system configuration process 500, such as the illustrative process shown in FIG. 5, reads the corresponding 16 bit physical identification value from the backplane, derives the 8-bit bus address and provides the configuration information to the hardware controller 110.

As shown in FIG. 5, the system configuration process 500 is initiated during step 510 upon the powering up of the hardware component 200. Thereafter, the system configuration process 500 reads the physical identifier from the backplane during step 520. As previously indicated, each hardware component 200 generally reads only a portion of the 16 bit value from the backplane, since, for example, each hardware component knows its own unit type.

Thereafter, the hardware component 200 calculates a unique bus address from a subset of the 16 bit physical identifier value during step 530. The physical information and bus address are optionally conveyed to the hardware controller 110 during step 540. Finally, the hardware component 200 uses the calculated bus address to communicate with other hardware components 200A–200H and the hardware controller on the common bus 115 during step 550.

It is to be understood that the embodiments and variations shown and described herein are merely illustrative of the principles of this invention and that various modifications may be implemented by those skilled in the art without departing from the scope and spirit of the invention.

We claim:

1. A method for determining an address that uniquely identifies a hardware component on a common bus, said method comprising the steps of:

reading identification information from a connector of said hardware component, said identification information having physical significance; and deriving a bus address from said identification information that uniquely identifies said hardware component on said common bus.

2. The method according to claim 1, wherein said identification information describes said hardware component.

3. The method according to claim 1, wherein said identification information describes how said hardware component is located within a larger piece of equipment.

4. The method according to claim 1, wherein said identification information identifies a carrier frequency associated with said hardware component.

5. The method according to claim 1, wherein said identification information identifies a sector number associated with said hardware component.

6. The method according to claim 1, wherein said identification information identifies a unit type associated with said hardware component.

7. The method according to claim 1, wherein said identification information identifies a unit number associated with said hardware component.

8. The method according to claim 1, wherein said identification information describes said hardware component and how said hardware component is located within a cell station.

9. The method according to claim 1, wherein said identification information describes said hardware component and how said hardware component is interconnected with other hardware components.

10. The method according to claim 1, further comprising the step of providing said identification information and bus address to a hardware controller.

11. A system for determining an address that uniquely identifies a hardware component on a common bus, said system comprising:
    a memory for storing computer readable code; and
    a processor operatively coupled to said memory, said processor configured to:
        read identification information from a connector of said hardware component, said identification information having physical significance; and
        derive a bus address from said identification information that uniquely identifies said hardware component on said common bus.

12. The system according to claim 11, wherein said identification information describes said hardware component.

13. The system according to claim 11, wherein said identification information describes how said hardware component is located within a larger piece of equipment.

14. The system according to claim 11, wherein said identification information identifies a carrier frequency associated with said hardware component.

15. The system according to claim 11, wherein said identification information identifies a sector number associated with said hardware component.

16. The system according to claim 11, wherein said identification information identifies a unit type associated with said hardware component.

17. The system according to claim 11, wherein said identification information identifies a unit number associated with said hardware component.

18. The system according to claim 11, wherein said identification information describes said hardware component and how said hardware component is located within a cell station.

19. The system according to claim 11, wherein said identification information describes said hardware component and how said hardware component is interconnected with other hardware components.

20. The system according to claim 11, wherein said processor is further configured to provide said identification information and bus address to a hardware controller.

21. A method for determining the configuration of a plurality of hardware components installed on a larger piece of equipment, said method comprising the steps of:
    providing an identification value to each of said hardware components, said identification value having physical significance;
    receiving physical identification information from each of said hardware components; and
    determining how said plurality of hardware component are interconnected.

22. The method according to claim 21, wherein said identification information describes said hardware component.

23. The method according to claim 21, wherein said identification information describes how said hardware component is located within a larger piece of equipment.

24. The method according to claim 21, wherein said identification information identifies one or more of: a carrier frequency associated with said hardware component, a sector number associated with said hardware component, a unit type associated with said hardware component, and a unit number associated with said hardware component.

25. The method according to claim 21, wherein said identification information describes said hardware component and how said hardware component is located within a cell station.

26. The method according to claim 21, further comprising the step of transmitting said configuration information to a centralized controller.

27. A system for determining the configuration of a plurality of hardware components installed on a larger piece of equipment, said system comprising:
    a memory for storing computer readable code; and
    a processor operatively coupled to said memory, said processor configured to:
        provide an identification value to each of said hardware components, said identification value having physical significance;
        receive physical identification information from each of said hardware components; and
        determine how said plurality of hardware component are interconnected.

28. The system according to claim 26, wherein said identification information describes said hardware component.

29. The system according to claim 26, wherein said identification information describes how said hardware component is located within a larger piece of equipment.

30. The system according to claim 26, wherein said identification information identifies one or more of: a carrier frequency associated with said hardware component, a sector number associated with said hardware component, a unit type associated with said hardware component, and a unit number associated with said hardware component.

31. The system according to claim 26, wherein said identification information describes said hardware component and how said hardware component is located within a cell station.

32. The system according to claim 26, wherein said processor is further configured to transmit said configuration information to a centralized controller.

33. A method performed by a first hardware component for determining the address of a second hardware component, said hardware components communicating on a common bus, said method comprising the steps of:

reading identification information from a connector of said first hardware component, said identification information having physical significance;

deriving a bus address from said identification information that uniquely identifies said first hardware component on said common bus; and utilizing a partitioning of said bus addresses to determine an address for said second hardware component.

34. A system used by a first hardware component to determine the address of a second hardware component, said hardware components communicating on a common bus, said system comprising:

a memory for storing computer readable code; and a processor operatively coupled to said memory, said processor configured to:

read identification information from a connector of said first hardware component, said identification information having physical significance;

derive a bus address from said identification information that uniquely identifies said first hardware component on said common bus; and utilize a partitioning of said bus addresses to determine an address for said second hardware component.

* * * * *